3,426,124
COSMETIC COMPOSITION CONTAINING PHENYL-BENZOFURYL-(2)-KETONES AND METHOD OF USING SAME
Heinrich Baron, Darmstadt-Eberstadt, and Rainer Klink and Günther Mohr, Darmstadt, Germany, assignors to E. Merck A.G., Darmstadt, Germany
No Drawing. Filed June 29, 1965, Ser. No. 468,147
Claims priority, application Germany, July 9, 1964, M 61,658
U.S. Cl. 424—59     7 Claims
Int. Cl. A61l 23/00; C07d 5/32

ABSTRACT OF THE DISCLOSURE

For protection against UV radiation, compositions and processes based on highly effective UV absorbents of the formula:

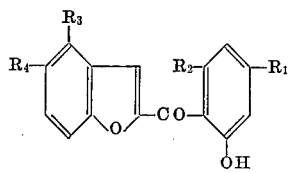

wherein
$R_1$ represents methyl, hydroxy, alkoxy of 1–12 carbon atoms, or allyloxy,
$R_2$ is hydrogen or methoxy, and
$R_3$ and $R_4$ represent hydrogen or, together, the group —CH=CH—CH=CH—.

---

This invention relates to a group of chemical compounds which are particularly useful as UV absorbents for technical and cosmetic applications.

A principal object of this invention is to provide novel and unobvious chemical compounds.

Another object is to provide processes for the production of these novel and unobvious compounds.

A still further object is to provide cosmetic compositions which are resistant to UV radiation.

A still further object of this invention is to provide chemical compositions and articles of manufacture which are resistant to UV radiation.

Still another object is to provide a process of administering the cosmetic compositions of this invention to mammals to prevent sunburn.

Upon further study of the specification and claims, other objects and advantages of the present invention will become apparent.

These objects are attained on the basis of the following compounds of Formula I:

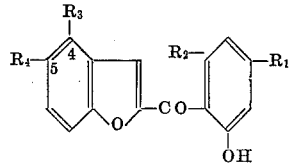

wherein
$R_1$ represents methyl, hydroxy, alkoxy of 1–12 carbon atoms, or allyloxy,
$R_2$ is hydrogen or methoxy, and
$R_3$ and $R_4$ represent hydrogen or, together, the group —CH=CH—CH=CH—.

Such compounds exhibit, in the UV range of about 290–400 m$\mu$ an excellent UV absorption (low transmittance) and in particular absorb in the range of 340–400 m$\mu$ more effectively than the commercially available, previously known UV absorbents.

In the following table, the percent transmission of four commercial preparations (A through D) and of two of the inventive substances (II and III) are tabulated as a function of wave length $\lambda$. The transmission is based on a concentration of 1 mg. in 100 ml. methanol, measured at a layer thickness of 1 cm. The letters and numbers represent:

(A) 2,2'-Dihydroxy-4,4'-dimethoxy-benzophenone
(B) 2-[o-Hydroxyphenyl]-benztriazole
(C) 2-Hydroxy-4-methoxy-benzophenone
(D) 2,2'-Dihydroxy-4-methoxy-benzophenone
(II) 2,4-Dihydroxyphenyl-benzofuryl-(2)-ketone
(III) 2-Hydroxy-4-methoxyphenyl-benzofuryl-(2)-ketone

PERCENT TRANSMISSION

| $\lambda$ in m$\mu$ | A | B | C | D | II | III |
|---|---|---|---|---|---|---|
| 290 | 29.0 | 21.0 | 19.5 | 28.5 | 34.7 | 31.0 |
| 300 | 34.0 | 19.0 | 30.5 | 37.0 | 29.6 | 25.3 |
| 310 | 34.5 | 25.0 | 36.0 | 37.5 | 27.6 | 23.0 |
| 320 | 31.5 | 22.0 | 33.1 | 34.0 | 25.0 | 20.0 |
| 330 | 28.0 | 17.0 | 34.5 | 34.0 | 22.0 | 18.1 |
| 340 | 26.0 | 17.0 | 42.5 | 41.0 | 19.1 | 15.9 |
| 350 | 28.5 | 25.0 | 59.5 | 53.5 | 17.0 | 14.1 |
| 360 | 38.5 | 42.0 | 79.0 | 70.5 | 17.7 | 15.4 |
| 370 | 57.0 | 75.0 | 91.5 | 82.0 | 24.5 | 23.1 |
| 380 | 76.0 | 94.0 | 97.0 | 92.0 | 38.7 | 40.2 |
| 390 | 91.0 | 99.0 | 99.0 | 97.5 | 57.5 | 61.8 |
| 400 | 97.0 | 99.0 | 100.0 | 100.0 | 75.0 | 81.4 |

Among the specific compounds covered by Formula I are 2-hydroxy-4-methylphenyl-benzofuryl-(2)-ketone
2,4-dihydroxyphenyl-benzofuryl-(2)-ketone
2-hydroxy-4-methoxyphenyl-benzofuryl-(2)-ketone
2-hydroxy-4-ethoxyphenyl-benzofuryl-(2)-ketone
2-hydroxy-4-n-propoxyphenyl-benzofuryl-(2)-ketone
2-hydroxy-4-isopropoxyphenyl-benzofuryl-(2)-ketone
2-hydroxy-4-n-butoxyphenyl-benzofuryl-(2)-ketone
2-hydroxy-4-isobutoxyphenyl-benzofuryl-(2)-ketone
2-hydroxy-4-sec.-butoxyphenyl-benzofuryl-(2)-ketone
2-hydroxy-4-n-pentyloxyphenyl-benzofuryl-(2)-ketone
2-hydroxy-4-isopentyloxyphenyl-benzofuryl-(2)-ketone
2-hydroxy-4-n-hexyloxyphenl-benzofurl-(2)-ketone
2-hydroxy-4-isohexyloxyphenyl-benzofuryl-(2)-ketone
2-hydroxy-4-n-heptyloxyphenyl-benzofuryl-(2)-ketone
2-hydroxy-4-isoheptyloxyphenyl-benzofuryl-(2)-ketone
2-hydroxy-4-n-octyloxyphenyl-benzofuryl-(2)-ketone
2-hydroxy-4-isooctyloxyphenyl-benzofuryl-(2)-ketone
2-hydrox-4-n-nonyloxyphenyl-benzofuryl-(2)-ketone
2-hydroxy-4-n-decyloxyphenyl-benzofuryl-(2)-ketone
2-hydroxy-4-n-undecycloxyphenyl-benzofuryl-(2)-ketone
2-hydroxy-4-n-dodecyloxyphenyl-benzofuryl-(2)-ketone
2-hydroxy-4-allyloxyphenyl-benzofuryl-(2)-ketone
2-hydroxy-4-methyl-6-methoxyphenyl-benzofuryl-(2)-ketone
2,4-dihydroxy-6-methoxyphenyl-benzofuryl-(2)-ketone
2-hydroxy-4,6-dimethoxyphenyl-benzofuryl-(2)-ketone
2-hydroxy-4-ethoxy-6-methoxyphenyl-benzofuryl-(2)-ketone
2-hydroxy-4-n-butoxy-6-methoxyphenyl-benzofuryl-(2)-ketone
2-hydroxy-4-n-octyloxy-6-methoxyphenyl-benzofuryl-(2)-ketone
2-hydroxy-4-n-dodecyloxy-6-methoxyphenyl-benzofuryl-(2)-ketone
2-hydroxy-4-allyloxy-6-methoxyphenyl-benzofuryl-(2)-ketone
2-hydroxy-4-methylphenyl-naphtho-[1,2:d]-furyl-(2)-ketone
2,4-dihydroxyphenyl-naphtho-[1,2:d]-furyl-(2)-ketone
2-hydroxy-4-methoxyphenyl-naphtho-[1,2:d]-furyl-(2)-ketone 2-hydroxy-4-n-octyloxyphenyl-naphtho-[1,2:d]-furyl-
(2)-ketone 2-hydroxy-4-n-dodecyloxyphenyl-naphtho-[1,2:d]-furyl-
(2)-ketone 2-hydroxy-4-allyloxyphenyl-naptho-[1,2:d]-furyl-(2)-
ketone The compounds of this invention are particularly suitable for technical or cosmetic applications wherein the transmittance must be decreased in the range between 290 and 400 mμ, particularly 340–400 mμ.

This is, for example, the case in the cosmetic field if, for any reason, it is desired to protect the skin, e.g., to avoid the formation of freckles. Moreover, by using weak concentrations, it is also possible to achieve tanning of the skin, with the simultaneous avoidance of a sun erythema.

In the technical field of application, it is apparent that the compounds of this invention can be beneficially utilized wherever UV exposure is deleterious. The compounds of this invention are particularly advantageous for the inhibition of UV-initiated deterioration of organic polymers, both natural and synthetic, including such common molded plastics as polyvinyl chlorides, methacrylates, cellulose acetate, polystyrenes, polyvinyl acetates, and polyolefins such as polyethylenes, polypropylenes, polybutadienes, etc., and common lacquers based on nitrocellulose, air- or oven-dried polyesters, epoxide resins, or polyol-diisocyanate. In this connection, it is only necessary to add a small amount of one or more compounds of this invention in intimate mixture with the organic polymer. Alternatively, coatings of the UV absorbent are also beneficial.

With respect to specific amounts of UV absorbent employed in various compositons, this of course will vary with the particular application. In general, however, a finite amount of UV absorbent will result in a finite UV absorbing amount; consequently, all concentrations will exhibit some finite degree of utility. As a matter of practice, however, in cosmetic compositions there are generally employed about 0.1 to 10% active UV absorbent by weight of the total composition. In chemical compositions, the amount can correspondingly vary from 0.1 to 10%, in organic polymers, preferably from 0.25 to 10%.

The compounds of this invention are particularly distinguished by their excellent stability, low toxicity, high resistance to light and to atmospheric conditions, and odorlessness. They are slightly yellow in color because of their strong absorption in the long-wave UV range, but this does not significantly affect their general utilization. By using a relatively low concentration for their application, the inherent color of the absorbent is hardly noticeable. Particularly successful are the following compounds:

2,4-dihydroxyphenyl-benzofuryl-(2)-ketone,
M.P. 140–142° C.

2-hydroxy-4-methoxyphenyl-benzofuryl-(2)-ketone,
M.P. 108–110° C.

2-hydroxy-4-allyloxyphenyl-benzofuryl-(2)-ketone,
M.P. 97–99° C.

2-hydroxy-4-methylphenyl-benzofuryl-(2)-ketone,
M.P. 67–69° C.

2,4-dihydroxyphenyl-naphtho-[1,2:d]-furyl-(2)-
ketone, M.P. 250° C.

2-hydroxy-4-methylphenyl-naphtho-[1,2:d]-furyl-
(2)-ketone, M.P. 150–152° C.

The compounds of this invention can be provided for all types of applications and in all types of compositions in which UV absorbents are conventionally employed.

Thus, for example, it is possible to incorporate the compounds of this invention in lotions, emulsions, salves, creams, aerosols, and the like, which are usually employed for topical administration to humans. Such cosmetic compositions for topical administration can be described as having a form ranging from a liquid to thixotropic non-Newtonian liquids, to semi-solids such as pastes, to oily solids having, for example, a consistency like butter. Carriers usually associated with UV-resistant cosmetic preparations can be employed, such as, for example, solid and liquid paraffin, ozocerite, ceresin, mineral wax, lignite wax, crystal oil, olive oil, sesame oil, almond oil, cocoa butter, beeswax, carnauba wax, woolfat, spermaceti, glycerol mono- and distearates, glycerol mono- and dioleates, stearic, palmitic and oleic acids, ethanol, isopropanol, cetyl alcohol, stearyl alcohol, palmityl alcohol, hexyldodecyl alcohol, synthetic fatty acid esters such as isopropyl myristate, isopropyl stearate, butyl stearates; emulsifiers such as ionogenic, non-ionogenic (such as polyoxyethylene stearate), cation-active, anion-active (f. e. cetyl sulfate) or ampholytic emulsifiers; wetting agents such as ethylene glycol, glycerol, sorbitol; thickening agents such as cellulose derivatives (f. e. methyl, ethyl, carboxymethyl celluloses), polyacrylic acid, tragacanth, agar-agar, gelatin.

Except for the 2,4-dihydroxyphenyl-benzofuryl-(2)-ketone, the compounds of Formula I are clearly novel. In the literature, Helvetica Chimica Acta, vol. 2, page 105 (1919), there is described a compound having a decomposition point of 253° C. and indicated as being 2-hydroxy-4-methoxyphenyl-benzofuryl-(2)-ketone. However, this compound must have a different structure, as its inordinately high decomposition point is way out of line. In contrast, the 2-hydroxy-4-methoxyphenyl-benzofuryl-(2)-ketone produced in accordance with the invention has a melting point of 108–110° C., and its chemical constitution is confirmed by the following analytical data: Calculated, C, 71.60; H, 4.47. Found: C, 71.4, 71.8; H, 4.5, 4.6.

and by the following maxima in the infrared spectrum (taken in CCl$_4$): 2900; 1605; 1275 cm.$^{-1}$.

The compounds of Formula I can be produced by reacting an acid of Formula II

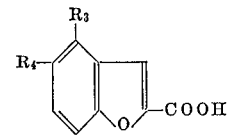

II or a functional acid derivative thereof, preferably a corresponding acid chloride or acid bromide, with a phenol of Formula III

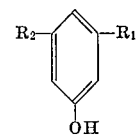

III in the presence of a Lewis acid, preferably in the presence of aluminum chloride;

or by converting, in a compound of Formula IV

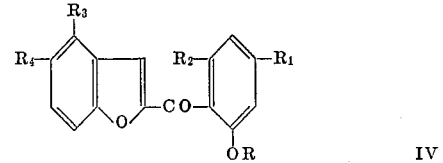

IV wherein R represents lower alkyl, preferably methyl, the residue OR and, if desired, also the residue R$_1$, into an OH group by ether splitting, preferably with aluminum chloride or pyridine hydrochloride;

or by converting, in a compound of Formula V

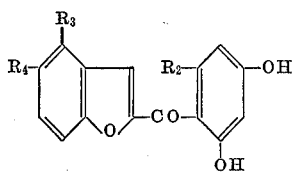

the free OH group in the 4-position into an alkoxy or allyloxy group, by reaction with an alkylating or allylating agent, respectively.

The reaction of compounds II (or functional acid derivatives thereof) and III is conducted under the conventional conditions of a Friedel-Crafts ketone synthesis. Solvents which are preferably employed herein are carbon disulfide, 1,2-dichloroethane, nitrobenzene, and hexane. However, it is also possible to conduct the reaction without the presence of an additional solvent. Generally, the reaction can be conducted at room temperature, if desired under cooling; however, it is recommended to apply heat towards the end of the reaction.

Compounds IV can be produced either by an analogous Friedel-Crafts reaction of an acid II (or an acid derivative thereof) with an alkyl ether of a phenol III, or by reaction of salicylic aldehyde or 2-hydroxy-1-naphthaldehyde (in the form of a salt) with a ketone of Formula VI

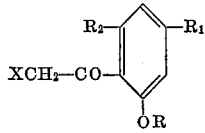

wherein X represents chlorine or bromine.

The ether splitting can be conducted according to any method described in the literature for the splitting of phenol ethers. Preferably, aluminum chloride or pyridine hydrochloride is used. If several alkoxy groups are present in the molecule, it is easy to selectively split the OR residue. If it is also desired to convert the residue $R_1$, in case it represents an alkoxy group, into an OH group, it is necessary to employ more vigorous reaction conditions. It is not necessary to isolate the compound IV in order to conduct the ether splitting. Thus, for example, the reaction mixture of a Friedel-Crafts reaction containing the compound IV can be subsequently heated, if desired after the solvent is removed, and/or after further adding aluminum chloride, and/or after adding another solvent, the desired ether splitting taking place.

The compounds of Formula V are preferably obtainable by ether splitting from compounds of Formula IV. An alkylation or allylation, respectively, of the compounds V takes place selectively in the 4-position, because the hydroxy group is bound in chelate fashion in the 2-position. Preferred alkylation agents are the corresponding alkyl halogenides, such as methyl iodide, ethyl bromide or ethyl iodide, propyl chloride, bromide, or iodide, etc., as well as dimethyl sulfate or diethyl sulfate; preferred allylation agents are allyl chloride or bromide. Suitable solvents for this reaction are, for example, methanol, ethanol, acetone, dimethyl formamide, and, for the reaction with dialkyl sulfates, aqueous solution of sodium hydroxide.

It is advantageous to conduct the reaction in the presence of a base, such as potassium carbonate or sodium hydroxide in order to bind the hydrogen halide which is produced. In place of the free compound V, it is also possible to react a corresponding salt, preferably the potassium salt or sodium salt, with the alkylating or allylating agent. Normally, the reaction is conducted under reflux; the preferred reaction times are between 10 minutes and 24 hours.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The figures in the following formulating examples are parts by weight.

EXAMPLE 1

Nitrocellulose lacquer

| | Parts by wt. |
|---|---|
| Nitrocellulose (cotton) of low viscosity | 20.0 |
| Dibutyl phthalate | 5.0 |
| 2,4-dihydroxyphenyl-benzofuryl-(2)-ketone | 0.5 |
| Toluene | 15.0 |
| n-Butanol | 10.0 |
| Butyl acetate 100% | 49.5 |

Upon application, the film of lacquer and the base material underneath are thereby protected from UV rays.

EXAMPLE 2

Methacrylate lamina

| | Parts by wt. |
|---|---|
| Methacrylic acid methyl ester | 99.05 |
| 2,4-dihydroxyphenyl-benzofuryl-(2)-ketone | 0.25 |
| Catalyst (benzoyl peroxide paste 50%) | 0.70 |

After preliminary polymerization to honey-like consistency, the main polymerization is conducted in a 4 mm. flat form. The plastic, as well as articles covered thereby, are thus well protected from UV rays.

EXAMPLE 3

Protective cream

| | Parts by wt. |
|---|---|
| Absorber base (mixture of about 5% emulsifying lanolin alcohols [cholesterol etc.] and about 95% aliphatic hydrocarbons) | 50 |
| 2-hydroxy-4-methoxyphenyl-benzofuryl-(2)-ketone | 2 |
| Water | 48 |

For covering light-sensitive parts of the body.

EXAMPLE 4

Preparation low in fatty materials

| | Parts by wt. |
|---|---|
| 2-hydroxy-4-methoxyphenyl-benzofuryl-(2)-ketone | 3 |
| Isopropyl myristate | 10 |
| Isopropanol, 70% | 87 |

This preparation is also suitable for aerosol containers.

EXAMPLE 5

Soft-PVC mixture

| | Parts by wt. |
|---|---|
| Polyvinyl chloride powder | 70.0 |
| Dioctyl phthalate | 16.5 |
| Dibutyl phthalate | 7.0 |
| Epoxide softener (epoxidized oil) | 3.5 |
| Stabilizer (barium-cadmium stabilizer) | 2.0 |
| Lubricant (heat-proof synthetic waxes) | 0.5 |
| 2,4-dihydroxyphenyl-benzofuryl-(2)-ketone | 0.5 |

Molded products made from this mixture exhibit a particular resistance against UV rays.

The following examples are preferred embodiments illustrating the production of the compounds of Formula I.

EXAMPLE 6

(a) A suspension is made of 11 g. resorcinol and 13.3 g. finely powdered aluminum chloride in 100 ml. carbon disulfide. During the course of 4 hours, there is added dropwise under stirring a solution of 18 g. benzofurane carboxylic acid-(2)-chloride in 50 ml. carbon disulfide. The solution is allowed to stand overnight and is heated the following day on the steam bath until the formation of hydrogen chloride is terminated. The solvent is decanted, and the residue is decomposed with ice water. The undissolved components are separated and recrystallized first from ethanol/water and then from isopropanol. The obtained 2,4-dihydroxyphenyl-benzofuryl-(2)-ketone melts at 140–142° C.

(b) 27.6 g. monosodium salt of 2,4-dihydroxyphenyl-benzofuryl-(2)-ketone are dissolved in methanol and mixed with 25.2 g. dimethyl sulfate. The mixture is heated for 15 minutes on a steam bath, is neutralized with sodium hydroxide solution, diluted with water, and the 2-hydroxy-4-methoxyphenyl-benzofuryl-(2)-ketone is recrystallized from isopropanol; M.P. 108–110° C.

EXAMPLE 7

(a) 2.3 g. sodium are dissolved in 300 ml. ethanol. Under vigorous stirring there are added 12.2 g. salicylic aldehyde and subsequently 21.4 g. ω-chloro-2,4-dimethoxy-acetophenone, and the mixture is heated under reflux conditions for 90 minutes. Then, the mixture is cooled, poured into 1 liter of water, extracted with chloroform, and the residue is distilled after the solvent has been removed by evaporation; B.P. 272° C./14 mm. The obtained 2,4-dimethoxyphenyl-benzofuryl-(2)-ketone solidifies and is recrystallized from isopropanol/water; M.P. 104° C.

(b) 7 g. 2,4-dimethoxyphenyl-benzofuryl-(2)-ketone are boiled for 15 minutes with 20 g. pyridine hydrochloride. The mixture is poured into water; the insoluble yellow oil is separated and taken up in twice the volume of isopropanol. There is obtained 2-hydroxy-4-methoxyphenyl-benzofuryl-(2)-ketone having the melting point of 108–110° C.

Analogously, there is obtained 2-hydroxy-4-methylphenyl-benzofuryl-(2)-ketone, M.P. 67–69° C., by reacting the sodium compound of salicylic aldehyde with ω-chloro-2-methoxy-4-methyl-acetophenone and subsequent ether splitting with pyridine hydrochloride.

EXAMPLE 8

(a) Analogously to Example 7(a), the sodium salt of 2-hydroxy-1-naphthaldehyde is prepared and reacted with ω-chloro-2,4-dimethoxy-acetophenone to form 2,4-dimethoxyphenyl-naphtho-[1,2:d]-furyl-(2)-ketone.

(b) 10 g. raw 2,4-dimethoxyphenyl-naphtho-[1,2:d]-furyl-(2)-ketone and 30 g. pyridine hydrochloride are boiled for 45 minutes. The mixture is poured into water, the precipitate is separated, and the obtained 2,4-dihydroxyphenyl-naphtho-[1,2:d]-furyl-(2)-ketone is recrystallized from isopropanol/water; M.P. 250° C.

Analogously, 2-hydroxy-1-naphthaldehyde is converted into the sodium salt, and the latter is converted, by reaction with ω-chloro-2-methoxy-4-methyl-acetophenone and subsequent ether splitting with pyridine hydrochloride, into 2-hydroxy-4-methylphenyl-naphtho-[1,2:d]-furyl-(2)-ketone having a melting point of 150–152° C.

EXAMPLE 9

1 g. 2,4-dihydroxyphenyl-benzofuryl-(2)-ketone is boiled for 12 hours together with 1 g. dodecyl bromide in the presence of 0.8 g. anhydrous potassium carbonate in 20 ml. dry acetone. Thereafter, the acetone is distilled off under vacuum, and the residue is mixed with water and extracted with chloroform. After removing the solvent, the obtained 2-hydroxy-4-dodecyloxyphenyl-benzofuryl-(2)-ketone is recrystallized from isopropanol.

EXAMPLE 10

25.4 g. 2,4-dihydroxyphenyl-benzofuryl-(2)-ketone (I) are dissolved in 50 ml. 2 N NaOH and 20 ml. water. After distilling off the water under vacuum, the residue is mixed with ethanol and again evaporated to dryness. The remaining sodium salt is dissolved in a small quantity of dimethyl formamide, 10 ml. allyl chloride are added, and the mixture is heated on a steam bath for 1 hour. Excess allyl chloride is distilled off under vacuum, the residue is poured into water, and the precipitated 2-hydroxy-4-allyl-oxyphenyl-benzofuryl-(2)-ketone is recrystallized from isopropanol; M.P. 97–99° C.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are propedly, equitably, and intended to be, within the full range of equivalence of the following claims.

What is claimed is:

1. A cosmetic composition for protection against UV radiation, said composition comprising a cosmetically acceptable carrier, and 0.1–10% by weight of an active UV absorbent of the formula:

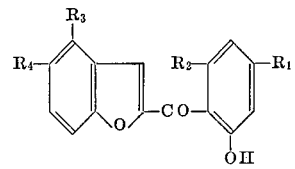

wherein
$R_1$ represents methyl, hydroxy, alkoxy of 1–12 carbon atoms, or allyloxy,
$R_2$ is hydrogen or methoxy, and
$R_3$ and $R_4$ represent hydrogen or, together, the group —CH=CH—CH=CH—.

2. A cosmetic composition as defined by claim 1 wherein said cosmetically acceptable carrier is selected from the group consisting of solid and liquid paraffin, ozocerite, ceresin, mineral wax, lignite wax, crystal oil, olive oil, sesame oil, almond oil, cocoa butter, beeswax, carnauba wax, wool fat, spermaceti, glycerol mono- and distearates, glycerol mono- and dioleates, stearic, palmitic and oleic acids, ethanol, isopropanol, cetyl alcohol, stearyl alcohol, palmityl alcohol, hexyldodecyl alcohol, isopropyl myristate, isopropyl stearate and butyl stearate.

3. A cosmetic composition as defined by claim 1, with the provision that when $R_1$ represents hydroxy, at least one of $R_2$, $R_3$, and $R_4$ is other than hydrogen.

4. A cosmetic composition as defined by claim 1 wherein said compound is 2,4-dihydroxyphenyl-benzofuryl-(2)-ketone or 2-hydroxy-4-methoxyphenyl-benzofuryl-(2)-ketone.

5. A process for decreasing the effect of UV radiation on mammalian skin, which process comprises topically administering an effective UV-absorbing amount of a compound of the formula:

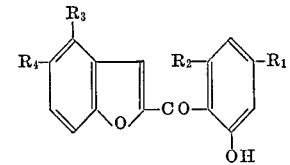

wherein
$R_1$ represents methyl, hydroxy, alkoxy of 1–12 carbon atoms, or allyloxy,
$R_2$ represents hydrogen or methoxy, and
$R_3$ and $R_4$ represent hydrogen or, together, the group —CH=CH—CH=CH—.

6. A process as defined by claim 5 with the provision that when $R_1$ represents hydroxy, at least one of $R_2$, $R_3$, and $R_4$ is other than hydrogen.

7. A process as defined by claim 4, wherein said compound is 2,4 - dihydroxyphenyl - benzofuryl - (2) - ketone or 2-hydroxy-4-methoxyphenyl-benzofuryl-(2)-ketone.

References Cited

UNITED STATES PATENTS 3,165,537  1/1965  Jurd _____ 260—346.2

ALBERT T. MEYERS, *Primary Examiner.*

D. R. MAHANAND, *Assistant Examiner.*

U.S. Cl. X.R.

260—346.2; 106—195; 260—45.8; 252—300